United States Patent
Tsuda et al.

(10) Patent No.: US 7,507,351 B2
(45) Date of Patent: *Mar. 24, 2009

(54) METHOD FOR PURIFYING ELECTROLUMINESCENT MATERIAL, ELECTROLUMINESCENT MATERIAL AND ELECTROLUMINESCENT DEVICE

(75) Inventors: Yoshihiro Tsuda, Tsukuba (JP); Yoshii Morishita, Tsukuba (JP); Satoyuki Nomura, Tsukuba (JP); Seiji Tai, Tokyo (JP); Yousuke Hoshi, Tsukuba (JP); Shigeaki Funyuu, Tsukuba (JP); Farshad J. Motamedi, Claremont, CA (US); Li-Sheng Wang, Arcadia, CA (US)

(73) Assignees: Hitachi Chemical Co., Ltd., Tokyo (JP); Maxdem Incorporated, San Dimas, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 10/559,273

(22) PCT Filed: Jun. 4, 2004

(86) PCT No.: PCT/JP2004/008154

§ 371 (c)(1),
(2), (4) Date: Apr. 18, 2006

(87) PCT Pub. No.: WO2004/113420

PCT Pub. Date: Dec. 29, 2004

(65) Prior Publication Data

US 2006/0247474 A1    Nov. 2, 2006

(30) Foreign Application Priority Data

Jun. 5, 2003    (JP)    ............................. 2003-160760
Jun. 5, 2003    (JP)    ............................. 2003-160761

(51) Int. Cl.
*C08G 85/00* (2006.01)
*C08G 61/00* (2006.01)
*C09K 11/06* (2006.01)

(52) U.S. Cl. .................. 252/301.16; 428/690; 428/917; 564/437; 564/438; 528/487; 526/69

(58) Field of Classification Search ............ 252/301.16; 428/690, 917; 564/437, 438; 528/487; 526/69
See application file for complete search history.

(56) References Cited

U.S. PATENT DOCUMENTS

| 4,539,507 | A |   | 9/1985  | VanSlyke et al. |
| 4,786,716 | A | * | 11/1988 | Van Broekhoven et al. . 528/487 |
| 4,855,400 | A | * | 8/1989  | van Broekhoven et al. .. 528/392 |
| 5,151,629 | A |   | 9/1992  | VanSlyke |
| 6,894,145 | B2 | * | 5/2005  | Xiao et al. .................. 528/490 |

FOREIGN PATENT DOCUMENTS

| CN | 1329100 A   | 1/2002  |
| CN | 1421470 A   | 6/2003  |
| EP |  283092 A1  | 9/1988  |
| EP | 0 443 861   | 8/1991  |
| JP | 11-171801   | 6/1999  |
| JP | 2000-327639 | 11/2000 |
| JP | 2001-316338 | 11/2001 |
| JP | 2002-80433  | 3/2002  |
| WO | WO 90/13148 | 11/1990 |
| WO | WO90/13148  | 11/1990 |
| WO | WO00/41443  | 7/2000  |

OTHER PUBLICATIONS

Chinese Office Action dated Aug. 24, 2007, of CN 200480015571.7.
Igor Sokolik et al.; "Blue-light electroluminescence from p-phenylene vinylene-based copolymers", J. Appl. Phys., vol. 74, No. 5, Sep. 1, 1993, pp. 3584-3586. Cited in spec.
Heather D. Maynard et al.; "Purification Technique For The Removal Of Ruthenium From Olefin Metathesis Reaction Product", Tetrahedron Letters, 1999, pp. 4137-4140.
Igor Sokolik et al.; Blue-light electroluminescence from p-phenylene vinylene-based copolymers; J. Appl. Phys., 74 (5), Sep. 1, 1993, pp. 3584-3586.
Chinese Office Action dated Jul. 11, 2008 of CN 2004800155717.

* cited by examiner

*Primary Examiner*—C. Melissa Koslow
(74) *Attorney, Agent, or Firm*—Westerman, Hattori, Daniels & Adrian, LLP.

(57) ABSTRACT

Objects of the present invention are to provide a purification process that enables Pd to be removed effectively, and to provide an electroluminescent material and an electroluminescent device obtained by employing the process. The present invention relates to a process for purifying an electroluminescent material, the process involving treating, with a phosphorus-containing material, an electroluminescent material that contains Pd as an impurity so as to remove the Pd.

9 Claims, No Drawings

METHOD FOR PURIFYING ELECTROLUMINESCENT MATERIAL, ELECTROLUMINESCENT MATERIAL AND ELECTROLUMINESCENT DEVICE

TECHNICAL FIELD

The present invention relates to a purification process for an electroluminescent material, and an electroluminescent material and an electroluminescent device obtained by employing the process.

BACKGROUND ART

Electroluminescent devices have been attracting attention as, for example, large-area solid state light sources to replace incandescent lamps and gas-filled lamps. They have also been attracting attention as self-luminous displays, and are the most promising alternative to liquid crystal displays in the flat panel display (FPD) field. In particular, an organic electroluminescent (EL) device, in which the device material is formed from an organic material, is being commercialized as a low power consumption full-color FPD. Above all, polymer-based organic EL devices will be indispensable for future large-screen organic EL displays since the organic material of the polymer-based organic EL devices is formed from a polymer material for which film formation by printing, ink-jet, etc. is simple compared with low molecular weight-based organic EL devices, which require film formation in a vacuum system.

Conventionally, polymer-based organic EL devices employ either a conjugated polymer such as poly(p-phenylene-vinylene) (see e.g. International Publication WO90/13148) or a non-conjugated polymer (see e.g. I. Sokolik, et al., J. Appl. Phys. 1993. 74, 3584) as the polymer material. However, their luminescence lifetime as a device is short, which gives rise to problems when constructing a full-color display.

With the object of solving these problems, polymer-based organic EL devices employing various types of polyfluorene-based and poly(p-phenylene)-based conjugated polymers have been proposed in recent years, but they are not satisfactory in terms of stability. This is due to impurities contained in the polymer and, in particular, the presence of Pd.

DISCLOSURE OF INVENTION

For example, when a synthetic reaction for a material that is used as an electroluminescent material is carried out employing a Pd catalyst, the Pd remains in the electroluminescent material after the reaction. When the Pd remains in the electroluminescent material, problems in terms of luminescence characteristics such as an increase in the luminescence starting voltage, a degradation in the luminescence efficiency, and a degradation in the stability easily occur. In order to solve these problems, it is necessary to purify the electroluminescent material subsequent to the reaction. With regard to a general purification process for an electroluminescent material, a soxhlet extraction method, a reprecipitation method, etc. are known. However, it is difficult to remove Pd by these methods.

The present invention solves the above-mentioned problems and provides a purification process that enables Pd to be removed effectively, and an electroluminescent material and an electroluminescent device obtained by employing the process.

That is, the present invention relates to a purification process for an electroluminescent material, the process comprising treating, with a phosphorus-containing material, an electroluminescent material that contains Pd as an impurity so as to remove the Pd.

Furthermore, the present invention relates to the purification process for an electroluminescent material, wherein the electroluminescent material is synthesized using a Pd catalyst.

Moreover, the present invention relates to the purification process for an electroluminescent material, wherein the electroluminescent material is a polymer or an oligomer.

Furthermore, the present invention relates to the purification process for an electroluminescent material, wherein the electroluminescent material is a conjugated polymer or oligomer.

Moreover, the present invention relates to an electroluminescent material that is purified by the purification process.

Furthermore, the present invention relates to the electroluminescent material, wherein the Pd concentration is equal to or less than 100 ppm.

Moreover, the present invention relates to an electroluminescent device obtained by employing the electroluminescent material.

The disclosures of the present invention relate to subject matter described in Japanese Patent Application Nos. 2003-160760 and 2003-160761 filed on Jun. 5, 2003, and the disclosures therein are incorporated herein by reference.

BEST MODE FOR CARRYING OUT THE INVENTION

Modes for carrying out the present invention are explained in detail below.

The purification process of the present invention comprises treating, with a phosphorus-containing material, an electroluminescent material that contains Pd as an impurity so as to remove the Pd. The treatment method is not particularly limited, and in the present invention a method in which a solution of an electroluminescent material is contacted with a phosphorus-containing material that is insoluble in the solution, a method in which a solution of an electroluminescent material (e.g., an organic solvent solution) is washed with a solution of a phosphorus-containing material (e.g., an aqueous solution) that is immiscible with the above-mentioned solution, etc. are preferably used. In the present invention, it is preferable to use the method in which a solution of an electroluminescent material is contacted with a phosphorus-containing material that is insoluble in this solution.

As a preferred embodiment, firstly, an electroluminescent material solution is obtained by dissolving in an appropriate solvent an electroluminescent material that contains Pd as an impurity. Any solvent can be used as long as it dissolves the electroluminescent material and the phosphorus-containing material is insoluble therein, and preferred examples thereof include tetrahydrofuran, dichloromethane, chloroform, toluene, xylene, and a mixed solvent thereof. The concentration of the electroluminescent material dissolved therein is preferably set in the range of 0.01 to 10 parts by weight relative to 100 parts by weight of the solvent, and more preferably 0.1 to 5 parts by weight. The dissolution temperature is preferably set at room temperature (25° C.) or higher but not more than the boiling point of the solvent used. The electroluminescent material solution thus obtained may be filtered as necessary to remove undissolved material.

The electroluminescent material solution thus obtained is subsequently treated with a phosphorus-containing material, and in general the phosphorus-containing material is added to the electroluminescent material solution. The amount of phosphorus-containing material is preferably set in the range of 0.01 to 100 parts by weight relative to 1 part by weight of the electroluminescent material, and more preferably 0.1 to 20 parts by weight. It is preferable to stir, with a magnetic stirrer, etc., the electroluminescent material solution to which the phosphorus-containing material has been added. The stirring temperature is preferably set at 10° C. or higher but not more than the boiling point of the solvent. The stirring time is not particularly limited, but it may be set at a level at which a sufficient effect in reducing the Pd concentration can be obtained, and the stirring time is preferably 10 minutes or longer, more preferably 1 hour or longer, and yet more preferably 10 hours or longer. From the viewpoint of workability, etc., the stirring time is preferably set at not more than 100 hours.

With regard to another preferred embodiment, there is a method in which the solution of the electroluminescent material is subjected to column chromatography using as a packing the phosphorus-containing material that is insoluble in the above-mentioned solution.

In this treatment, the Pd contained in the electroluminescent material adsorbs on the phosphorus-containing material.

After completion of stirring, the phosphorus-containing material that has adsorbed the Pd is removed, by filtration, etc., from the electroluminescent material solution to which the phosphorus-containing material has been added and the solvent may further be removed by an evaporator, etc. When the purified electroluminescent material is in the form of a syrup, it is difficult to dry even by vacuum drying, and the solvent tends to remain. The syrup-form electroluminescent material may therefore be dissolved again in a solvent that can dissolve it, the solution thus obtained is then added dropwise, while stirring, to a solvent that makes the electroluminescent material precipitate, thus precipitating the target electroluminescent material in the form of fibers. With regard to solvents that dissolve the electroluminescent material, those described above can be used, and with regard to solvents that make the electroluminescent material precipitate, acetone, methanol, ethanol, ethyl acetate, ether, hexane, a mixed solvent thereof, etc. can be cited.

Furthermore, although the present purification process is effective when it is carried out just once, by repeating the process the removal of Pd can be promoted. Although it depends on the amount of Pd contained in the electroluminescent material that is to be purified, the present purification process is preferably carried out once to twenty times, and more preferably once to ten times while taking into consideration the yield, the number of steps, and the Pd concentration after purification.

Moreover, the purification process of the present invention may include any other steps.

The term 'phosphorus-containing material' referred to in the present invention means a phosphorus atom-containing compound itself or a material modified by the compound, and it is preferable to use the material modified by the compound. With regard to the 'phosphorus-containing material', one that is insoluble in a solvent that dissolves the electroluminescent material is generally used.

The 'phosphorus atom-containing compound' of the present invention is preferably a compound that acts on Pd and has the ability to coordinate to Pd. Examples of the phosphorus atom-containing compound include a phosphine ($R_3P$), a phosphate (($RO)_3PO$), a phosphite (($RO)_3P$), and derivatives thereof, and in the present invention it is preferable to use a phosphine or a derivative thereof.

The phosphine may be any of hydrogen phosphide ($PH_3$), a primary phosphine ($RPH_2$), a secondary phosphine ($R_2PH$), and a tertiary phosphine ($R_3P$) (R independently denotes a substituted or unsubstituted alkyl group, aryl group, or aralkyl group); detailed examples thereof include diphenylphosphine or a derivative thereof, triphenylphosphine or a derivative thereof, and a trialkylphosphine or a derivative thereof, but the present invention is not limited thereto.

In the present invention, two or more types of phosphorus atom-containing materials may be used at the same time.

Examples of the material that is modified by the compound include inorganic materials such as silica gel, alumina, zirconia, and titania; and organic materials such as crosslinked polystyrene and polymethacrylate, but they should not be construed as being limiting thereto.

Specific examples of the phosphorus-containing material that can be used in the present invention include Si-DPP (R45030B) manufactured by Silicycle, Inc; a triphenylphosphine-modified crosslinked polystyrene such as triphenylphosphine, polymer-bound, on styrene-divinylbenzene copolymer (20% crosslinked), manufactured by STREM Chemicals, Inc. (No. 15-6730); triphenylphosphine polystyrene, manufactured by Novabiochem (01-64-0308); triphenylphosphine polymer-bound, manufactured by Sigma-Aldrich Co. (93094); triphenylphosphine polymer-bound, manufactured by Sigma-Aldrich Co. (36645-5); dicyclohexylphenylophosphine, polymer-bound, manufactured by Sigma-Aldrich Co. (63212-0); (4-hydroxyphenyl)diphenylphosphine, polymer-bound, manufactured by Sigma-Aldrich Co. (59673-6); poly(ethylene glycol)triphenylphosphine, manufactured by Sigma-Aldrich Co. (53264-9); and PS-triphenylphosphine, manufactured by Argonaut Technologies, Inc. (800378 to 81).

In the present invention, any electroluminescent material may be used as long as Pd is contained as an impurity and, in particular, it is preferable to use an electroluminescent material synthesized using a Pd catalyst.

The Pd catalyst may be a Pd (0) complex or a Pd (II) salt. Examples of the Pd catalyst include palladium chloride, palladium acetate, palladium hydroxide, palladium nitrate, tetraammine palladium (II) chloride hydrate, dichlorobis(triphenylphosphine) palladium, dinitrodiammine palladium, tetrakis(triphenylphosphine) palladium, di-µ-chlorobis(η-allyl) palladium, bis(acetylacetonato) palladium, dichlorobis (benzonitrile) palladium, dichlorobis(acetonitrile) palladium, palladium propionate, tris(dibenzylideneacetone) dipalladium, [1,1'-bis(diphenylphosphino)ferrocene]palladium (II) chloride, tetrakis(tri-o-tolylphosphine) palladium, tetrakis(tri-t-butylphosphine) palladium, bis(1,2-bis(diphenylphosphino)ethane) palladium, bis(1,1'-bis(diphenylphosphino)ferrocene) palladium, and tetrakis(triethylphosphite) palladium.

With regard to a method for synthesizing an electroluminescent material using a Pd catalyst, there are the Heck reaction in which an aryl halide or a vinyl halide is reacted with a terminal olefin to give a substituted olefin, the Sonogashira coupling reaction in which an aryl halide or a haloalkane is reacted with a terminal acetylene to give a disubstituted acetylene, the Stille coupling reaction in which an aryl halide or a vinyl halide is reacted with an organotin compound, the Suzuki coupling reaction in which an aryl halide or a vinyl halide is reacted with a boron compound, etc., but they should not be construed as being limiting thereto. In the present invention, it is preferable to use an electroluminescent material synthesized by the Suzuki coupling reaction.

In the present invention, the electroluminescent material is preferably a polymer or an oligomer, and more preferably a conjugated polymer or oligomer. Furthermore, the weight-average molecular weight of the electroluminescent material is preferably 1,000 or greater, more preferably 10,000 or greater, and yet more preferably 100,000 or greater, and in order for the viscosity when dissolved in a solvent to be such that it is possible to stir, the weight-average molecular weight is preferably no more than 1,000,000.

The term 'conjugated polymer' referred to in the present invention means either a completely conjugated polymer, that is, a polymer that is conjugated throughout the length of its polymer chain, or a partially conjugated polymer, that is, a polymer that includes both a conjugated part and a nonconjugated part. The same applies to the term 'conjugated oligomer'.

Specific examples of the electroluminescent material include polymers and oligomers containing, as a main backbone, a poly(arylene) such as polyphenylene, polyfluorene, polyphenanthrene, or polypyrene, or a derivative thereof; a poly(heteroarylene) such as polythiophene, polyquinoline, or polycarbazole, or a derivative thereof; a poly(arylenevinylene), or a derivative thereof; a poly(aryleneethynylene), or a derivative thereof; and polymers and oligomers having, as a unit (that is, not limited to a structure in the main backbone and may be a side chain structure), a structure of benzene, naphthalene, anthracene, phenanthrene, chrysene, rubrene, pyrene, perylene, indene, azulene, adamantane, fluorene, fluorenone, dibenzofuran, carbazole, dibenzothiophene, furan, pyrrole, pyrroline, pyrrolidine, thiophene, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, pyrazine, piperazine, triazine, trithiane, norbornene, benzofuran, indole, benzothiophene, benzimidazole, benzoxazole, benzothiazole, benzothiadiazole, benzoxadiazole, purine, quinoline, isoquinoline, coumarin, cinnoline, quinoxaline, acridine, phenanthroline, phenothiazine, flavone, triphenylamine, acetylacetone, dibenzoylmethane, picolinic acid, silole, porphyrin, or a coordination compound of a metal such as iridium; or a derivative thereof. It is also possible to employ a low molecular weight compound having these backbones.

In the present invention, it is preferable to employ a polymer or an oligomer containing as the main backbone a poly (arylene), a derivative thereof, a poly(heteroarylene), or a derivative thereof. It is also preferable to employ a polymer or an oligomer containing as the unit of benzene, naphthalene, anthracene, phenanthrene, pyrene, fluorene, dibenzofuran, carbazole, dibenzothiophene, furan, thiophene, oxadiazole, triazole, thiadiazole, pyridine, triazine, benzothiophene, benzimidazole, benzoxazole, benzothiazole, benzothiadiazole, benzoxadiazole, quinoline, isoquinoline, acridine, phenanthroline, triphenylamine, acetylacetone, dibenzoylmethane, or a coordination compound of a metal such as iridium; or a derivative thereof.

It is preferable for the electroluminescent material purified by the purification process of the present invention to have a Pd content of 100 ppm or less, and more preferably 50 ppm or less.

The general structure of an electroluminescent device employing the electroluminescent material obtained by the purification process of the present invention is not particularly limited, and is described in, for example, U.S. Pat. Nos. 4,539,507 and 5,151,629. A polymer-containing electroluminescent device is described in, for example, International Patent Application WO90/13148 and EP-A-0443861.

These electroluminescent devices usually include an electroluminescent layer (light-emitting layer) between cathode and anode electrodes, at least one of which is transparent. Furthermore, at least one electron injection layer and/or electron transporting layer is inserted between the electroluminescent layer (light-emitting layer) and the cathode and, moreover, at least one positive hole injection layer and/or positive hole transporting layer is inserted between the electroluminescent layer (light-emitting layer) and the anode. As a material for the cathode, for example, a metal or metal alloy such as Li, Ca, Mg, Al, In, Cs, Mg/Ag, or LiF is preferable. As a material for the anode, a metal (e.g. Au) or another material having metallic conductivity such as, for example, an oxide (e.g. ITO: indium oxide/tin oxide) on a transparent substrate (e.g. a glass or a transparent polymer) can be used.

The purification process of the present invention may be applied not only to an electroluminescent material that is used in a light-emitting layer, but also to an electroluminescent material that is used in any other standard layer of the electroluminescent device.

As is clear from Examples, Comparative Examples, etc., the process for purifying an electroluminescent material of the present invention exhibits an excellent effect in removing impurities, and is suitable for the production of an electroluminescent material and an electroluminescent device having excellent luminescence characteristics, stability, etc.

EXAMPLES

The present invention is explained further in detail below with reference to examples, but the present invention is not limited by the examples below.

Synthetic Example 1

Synthesis of Poly(9,9-di-n-octylfluorene)

A 2M aqueous solution of $K_2CO_3$ was added to a toluene solution of dicaprylmethylammonium chloride (3%), 2,7-dibromo-9,9-dioctylfluorene (0.4 mmol), 9,9-dioctylfluorene diborate (0.4 mmol), which is represented by Compound (1), and $Pd(0)(PPh_3)_4$ (0.008 mmol), and the mixture was refluxed under nitrogen for 48 hours while stirring vigorously.

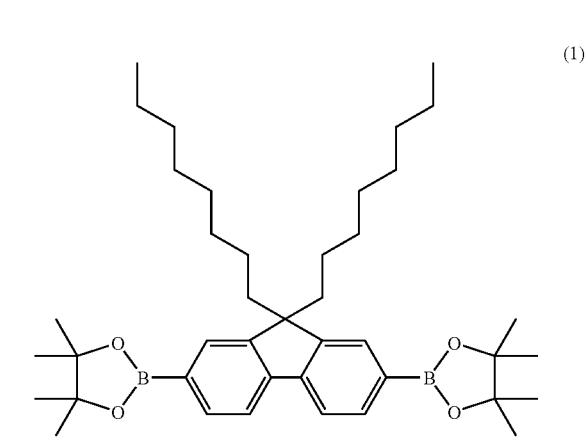

(1)

After the reaction mixture was cooled to room temperature, it was poured into methanol-water to precipitate a solid. The solid thus precipitated was filtered under suction and washed with methanol-water to give a solid. The solid thus obtained by filtration was dissolved in toluene, and the solution was poured into a large amount of methanol-acetone to precipitate a solid. The solid thus precipitated was filtered under suction and washed with methanol-acetone to give a polyfluorene. The polymer thus obtained was subjected to ICP emission spectrometry, and it was found that the Pd content was 800 ppm.

The quantitative method for Pd by ICP emission spectrometry was as follows.

5 mg of the sample was weighed, sulfuric acid, nitric acid, perchloric acid, and hydrofluoric acid were added thereto, it was decomposed by heating, the decomposed substance was dissolved in diluted aqua regia to give a test sample, and measurement was carried out using an SPS3000 ICP emission spectrometer manufactured by Seiko Instruments Inc. (the same applies below).

The polymer thus obtained was a polyfluorene, which is a conjugated polymer and can be used as an electroluminescent material.

Example 1

Purification of Polyfluorene (1)

The polyfluorene (100 mg) obtained in Synthetic Example 1 was dissolved in toluene (10 mL), a 2-diphenylphosphinoethyl-modified silica gel (Si-DPP manufactured by SILICYCLE Inc. (R45030B)) (20 mg) was added thereto, and the mixture was stirred for 15 hours. The polymer solution obtained by filtration was concentrated by a rotary evaporator. The solid thus obtained was dissolved in toluene, and the solution was poured into a large amount of methanol-acetone to precipitate a solid. The solid thus precipitated was filtered under suction and washed with methanol-acetone to give a polymer. The polymer thus obtained was subjected to ICP emission spectrometry, and it was found that the Pd content was 600 ppm.

Example 2

Purification of Polyfluorene (2)

Purification was carried out in the same manner as in Example 1 except that 200 mg of the 2-diphenylphosphinoethyl-modified silica gel was used instead of 20 mg. The polymer thus obtained was subjected to ICP emission spectrometry and it was found that the Pd content was 200 ppm.

Example 3

Purification of Polyfluorene (3)

Purification was carried out in the same manner as in Example 1 except that 1 g of the 2-diphenylphosphinoethyl-modified silica gel was used instead of 20 mg. The polymer thus obtained was subjected to ICP emission spectrometry and it was found that the Pd content was 30 ppm.

Example 4

Purification of Polyfluorene (4)

Purification was carried out in the same manner as in Example 1 except that a triphenylphosphine-modified crosslinked polystyrene (triphenylphosphine, polymer-bound, on styrene-divinylbenzene copolymer (20% crosslinked) manufactured by STREM chemicals, Inc. (No. 15-6730)) (200 mg) was used instead of the 2-diphenylphosphinoethyl-modified silica gel (20 mg). The polymer thus obtained was subjected to ICP emission spectrometry and it was found that the Pd content was 20 ppm.

Comparative Example 1

Purification by Reprecipitation

The polyfluorene obtained in Synthetic Example 1 was dissolved in toluene and the solution was then poured into a large amount of methanol-acetone to precipitate a solid. The solid thus precipitated was filtered under suction and washed with methanol-acetone to give a polymer. The polymer thus obtained was subjected to ICP emission spectrometry and it was found that the Pd content was 800 ppm, and no effect in removing Pd was shown.

Examples 5 to 8 and Comparative Example 2

Fabrication and Evaluation of Organic EL Device

A toluene solution (1.0 wt %) of each of the polyfluorenes obtained in Examples 1 to 4 and Comparative Example 1 was applied on a glass substrate, which had been subjected to patterning with a 2 mm width of ITO (indium tin oxide), by spin coating under a dry nitrogen atmosphere to form a luminescent polymer layer (coating thickness 70 nm). Subsequently, it was dried by heating under a dry nitrogen atmosphere on a hot plate at 80° C./5 minutes. The glass substrate thus obtained was transferred to a vacuum deposition machine, and an electrode was formed on the luminescent layer from LiF (coating thickness 10 nm) and Al (coating thickness 100 nm) in that order. The ITO/luminescent polymer layer/LiF/Al device thus obtained was connected to a power source so that a voltage was applied using the ITO as a positive electrode and the LiF/Al as a negative electrode, and the results for the luminescence starting voltage to obtain a luminance of 1 cd/m$^2$, and the power efficiency at a luminance of 100 cd/m$^2$ were as shown in Table 1.

TABLE 1

| Example | Polyfluorene | Turn on voltage (V) | Power efficiency (lm/W) |
|---|---|---|---|
| Example 5 | Example 1 | 6.0 | 0.03 |
| Example 6 | Example 2 | 6.0 | 0.05 |
| Example 7 | Example 3 | 5.5 | 0.06 |
| Example 8 | Example 4 | 5.5 | 0.11 |
| Comparative Example 2 | Comparative Example 1 | 6.5 | 0.03 |

Synthetic Example 2

Synthesis of Compound (2)

The procedure of Synthetic Example 1 was repeated except that compound (3) (0.2 mmol) and compound (4) (0.2 mmol) were used instead of 2,7-dibromo-9,9-dioctylfluorene (0.4 mmol), thus giving compound (2). The polymer thus obtained was subjected to ICP emission spectrometry, and it was found that the Pd content was 1900 ppm.

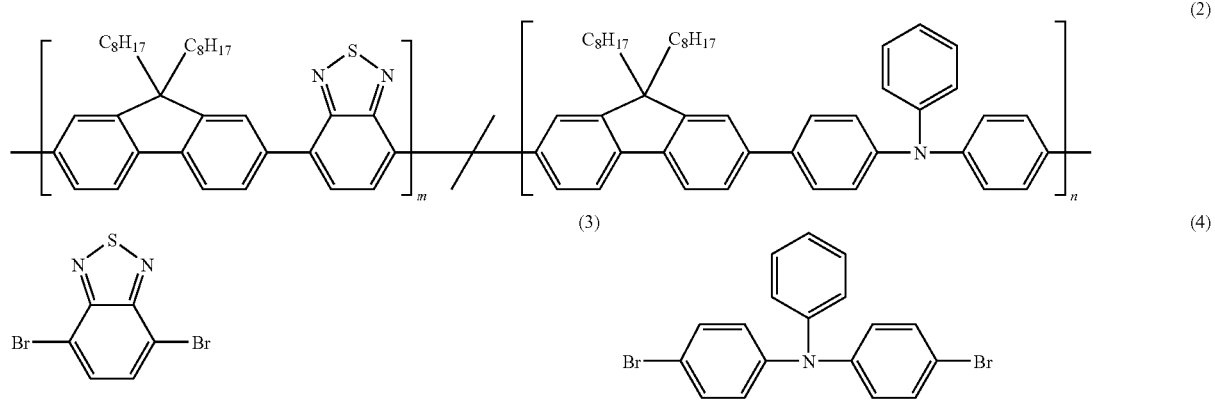

Example 9

Purification (1) of Compound (2)

Compound (2) (100 mg) was dissolved in toluene (10 mL), a triphenylphosphine-modified crosslinked polystyrene (triphenylphosphine, polymer-bound, on styrene-divinylbenzene copolymer (20% crosslinked) manufactured by STREM Chemicals, Inc. (No. 15-6730)) (200 mg) was added thereto, and the mixture was stirred for 15 hours. The polymer solution obtained by filtration was concentrated by a rotary evaporator. The solid thus obtained was dissolved in toluene, and then poured into a large amount of methanol-acetone so as to precipitate a solid. The solid thus precipitated was filtered under suction and washed with methanol-acetone to give a polymer. The polymer thus obtained was subjected to ICP emission spectrometry, and it was found that the Pd content was 300 ppm.

Example 10

Purification (2) of Compound (2)

The same operation as in Example 9 was repeated twice using compound (2) to give a polymer. The polymer thus obtained was subjected to ICP emission spectrometry, and it was found that the Pd content was 50 ppm.

Example 11

Purification (3) of Compound (2)

The same operation as in Example 9 was repeated four times using compound (2) to give a polymer. The polymer thus obtained was subjected to ICP emission spectrometry, and it was found that the Pd content was 30 ppm.

Example 12

Purification (4) of Compound (2)

The same operation as in Example 9 was repeated six times using compound (2) to give a polymer. The polymer thus obtained was subjected to ICP emission spectrometry, and it was found that the Pd content was 10 ppm.

Examples 13 to 17

Fabrication and Evaluation of Organic EL Device of Compound (2)

Organic EL devices were fabricated and evaluated in the same manner as in Examples 5 to 8 except that the polymers obtained in Synthetic Example 2 and Examples 9 to 12 were used instead of polyfluorene, and the results of luminescence starting voltage, power efficiency, and luminance half-life from an initial luminance of 100 cd/m$^2$ are given in Table 2.

TABLE 2

| Example | Compound (2) | Turn on voltage (V) | Power efficiency (lm/W) | Luminance half-life (h) |
|---|---|---|---|---|
| Example 13 | Synthetic Example 2 | 4.5 | 0.18 | 0.4 |
| Example 14 | Example 9 | 3.0 | 1.69 | 5.6 |
| Example 15 | Example 10 | 3.0 | 1.77 | 400 |
| Example 16 | Example 11 | 3.0 | 1.85 | 600 |
| Example 17 | Example 12 | 3.0 | 1.96 | 700 |

Examples 18 to 41

Purification of Electroluminescent Material and Fabrication and Evaluation on of Electroluminescent Device Purification was carried out in the same manner as in Example 9 except that the electroluminescent materials shown in Table 3 were used instead of polyfluorene; fabrication and evaluation of organic EL devices were carried out in the same manner as in Examples 5 to 8, and the results thus obtained are given in Table 3. It was confirmed in all of the organic EL devices that, compared with a case in which an unpurified electroluminescent material was used, the luminescence starting voltage decreased and the power efficiency improved.

TABLE 3

| Example | electroluminescent material | Pd concentration (ppm) | Turn on voltage (V) | Power efficiency (lm/W) |
|---|---|---|---|---|
| Example 18 | (5) (m:n = 3:2) | 30 | 3.5 | 1.16 |
| Example 19 | (6) (m:n = 1:2) | 60 | 4.0 | 0.22 |
| Example 20 | (7) (m:n = 1:1) | 60 | 5.0 | 0.34 |
| Example 21 | (8) (m:n = 3:7) | 40 | 3.0 | 1.33 |
| Example 22 | (9) (m:n = 1:2) | 50 | 5.0 | 1.07 |
| Example 23 | (10) (l:m:n = 40:7:3) | 70 | 5.5 | 0.83 |
| Example 24 | (11) (l:m:n = 40:7:3) | 60 | 5.0 | 0.75 |
| Example 25 | (12) (m:n = 4:1) | 60 | 5.5 | 0.94 |
| Example 26 | (13) (m:n = 4:1) | 90 | 3.5 | 1.34 |
| Example 27 | (14) (m:n = 4:1) | 40 | 5.5 | 0.90 |
| Example 28 | (15) (m:n = 1:9) | 90 | 6.5 | 0.36 |
| Example 29 | (16) (m:n = 1:1) | 60 | 4.5 | 0.79 |
| Example 30 | (17) (m:n = 1:4) | 20 | 3.0 | 2.05 |
| Example 31 | (18) (m:n = 1:1) | 50 | 4.0 | 0.74 |
| Example 32 | (19) (m:n = 1:4) | 60 | 3.5 | 0.95 |
| Example 33 | (20) (m:n = 1:1) | 80 | 4.5 | 0.99 |
| Example 34 | (21) (m:n = 1:4) | 40 | 3.5 | 1.43 |
| Example 35 | (22) (m:n = 1:1) | 60 | 4.0 | 1.02 |
| Example 36 | (23) (m:n = 1:4) | 90 | 3.5 | 1.75 |
| Example 37 | (24) | 40 | 8.0 | 0.06 |
| Example 38 | (25) | 30 | 6.0 | 0.26 |
| Example 39 | (26) | 40 | 8.5 | 0.04 |
| Example 40 | (27) | 50 | 7.0 | 0.12 |
| Example 41 | (28) | 60 | 7.5 | 0.09 |

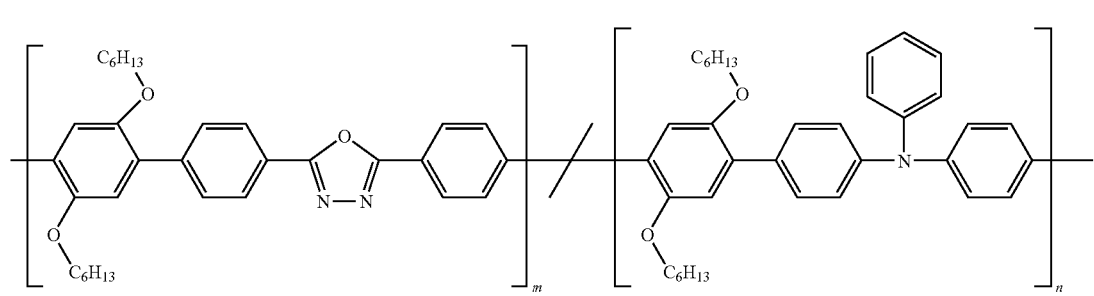
(5)
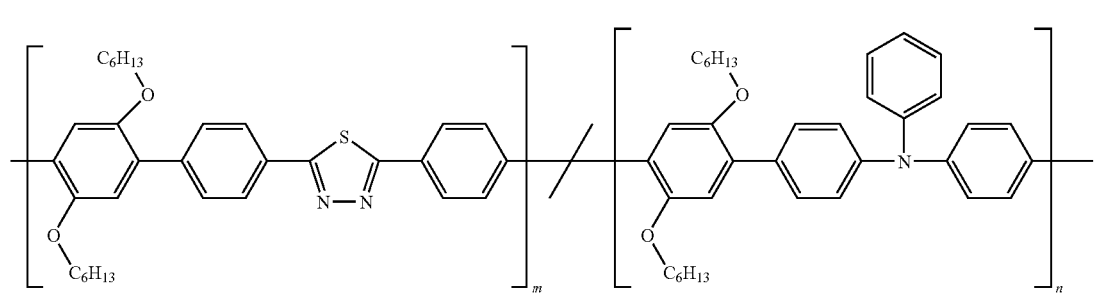
(6)
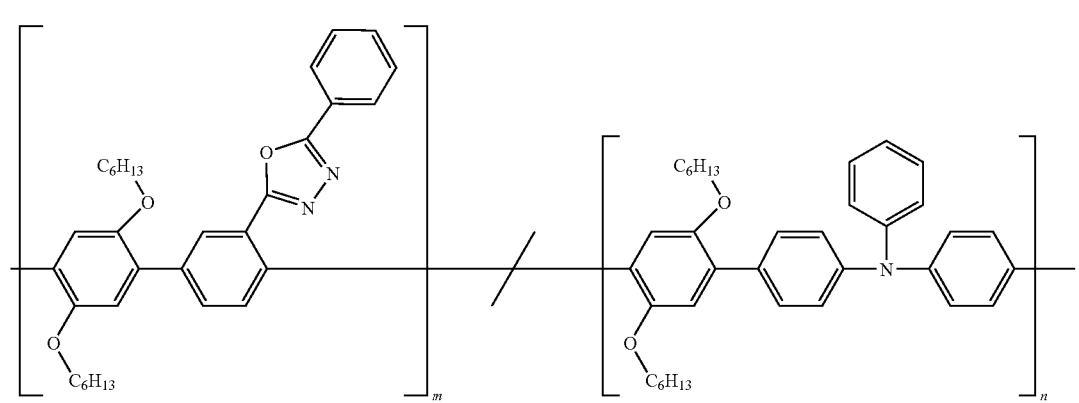
(7)
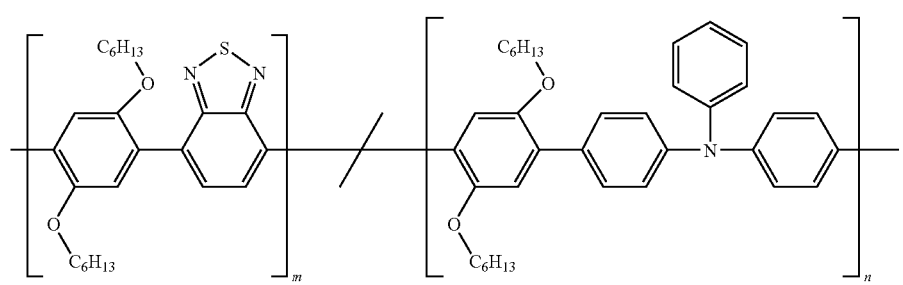
(8)
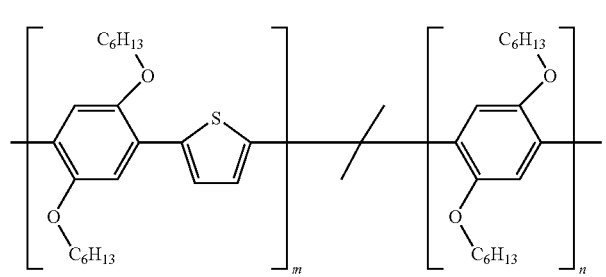
(9)

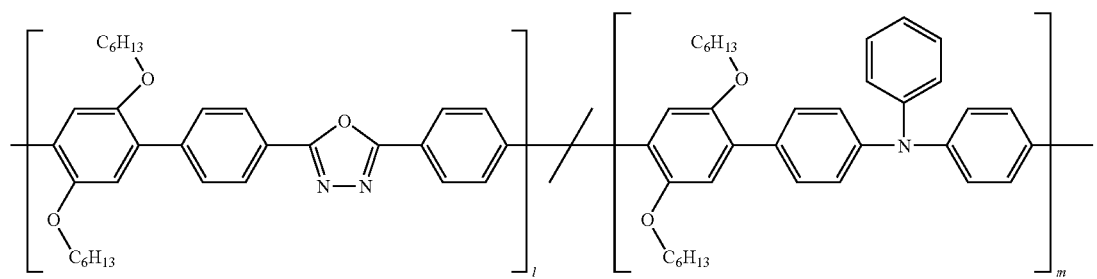
(10)
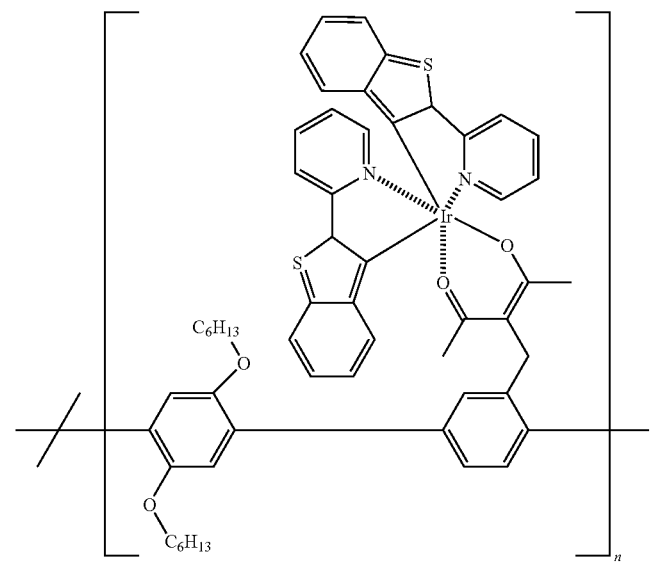
(11)
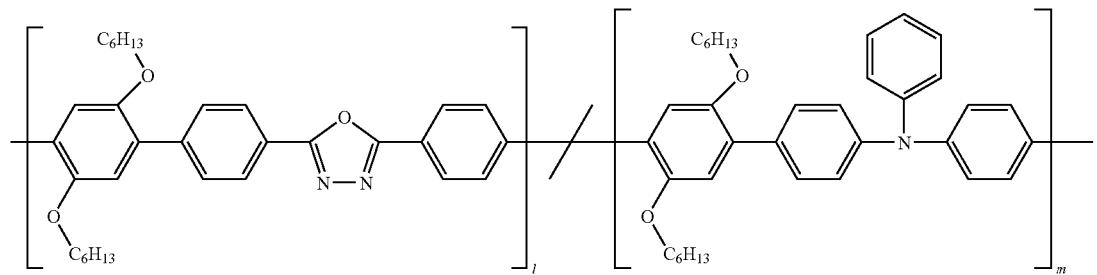

-continued
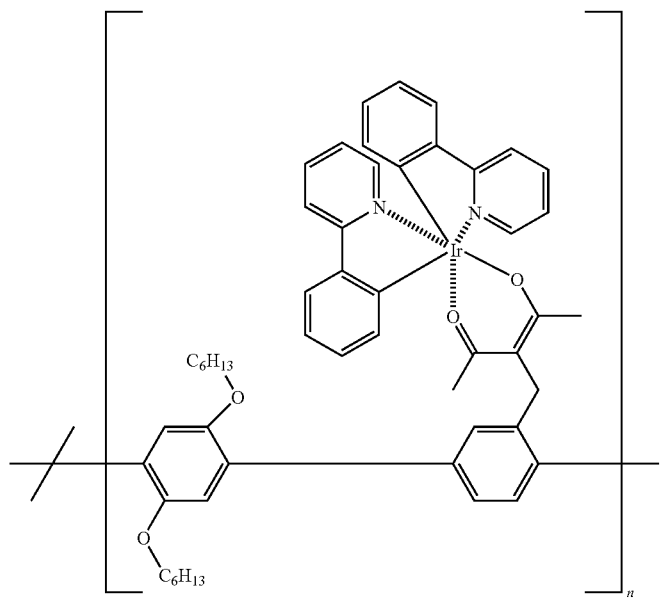
(12)
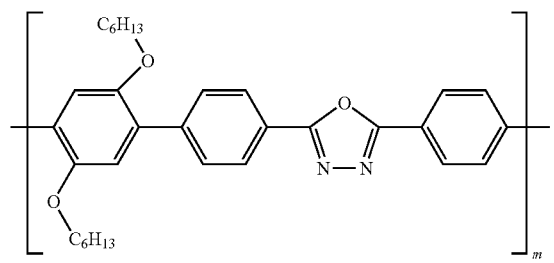
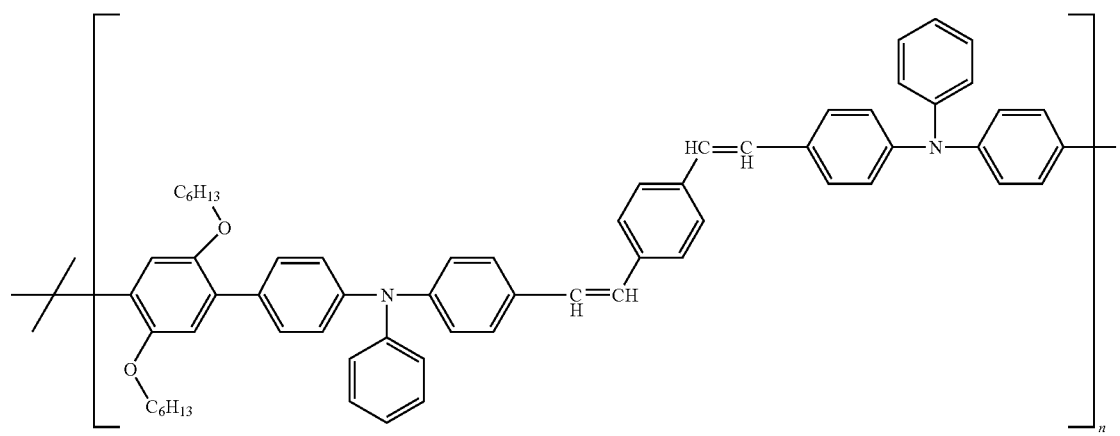
(13)
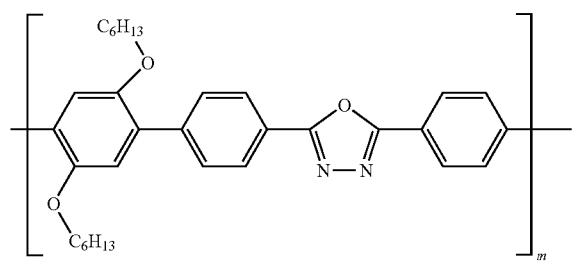

-continued
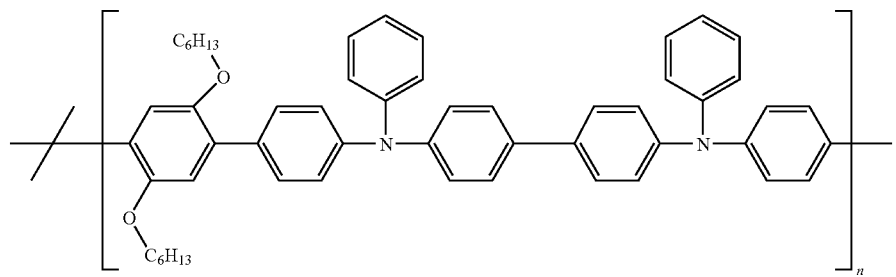
(14)
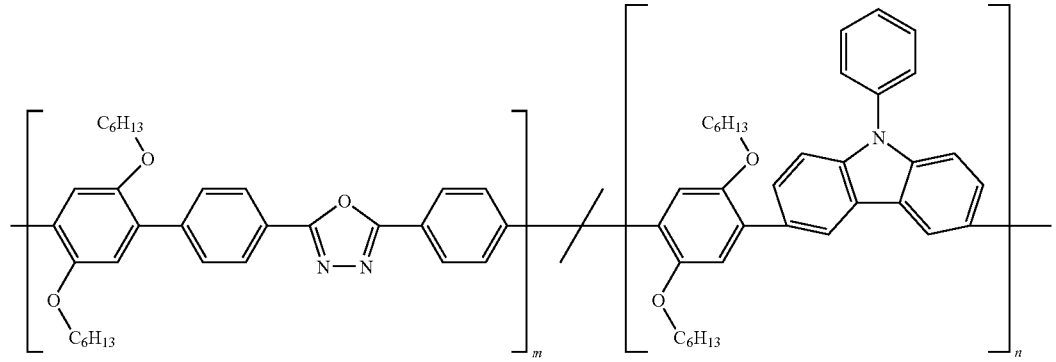
(15)
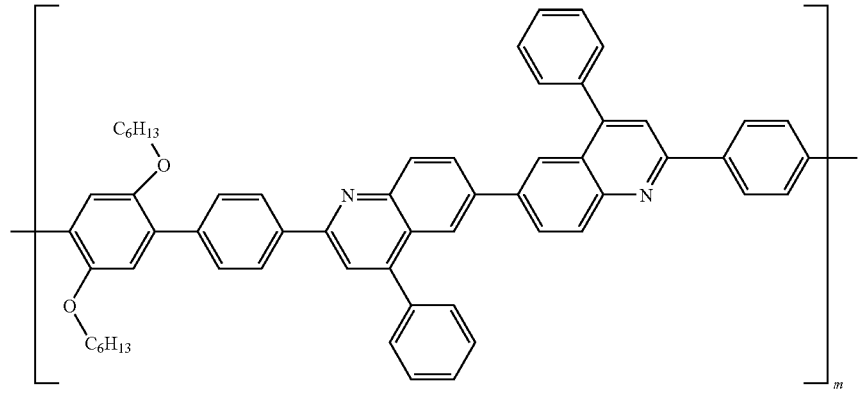
(16)
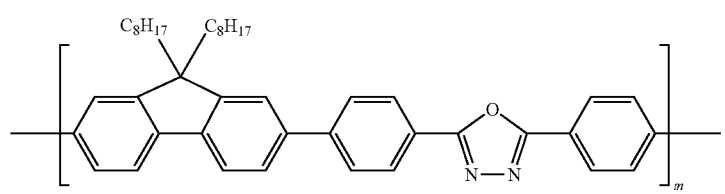

-continued
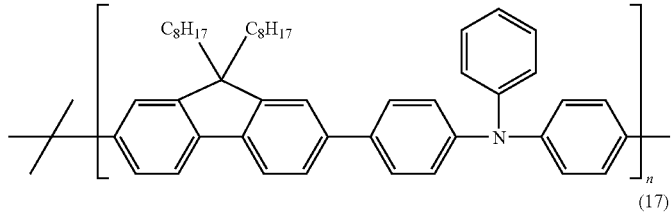
(17)
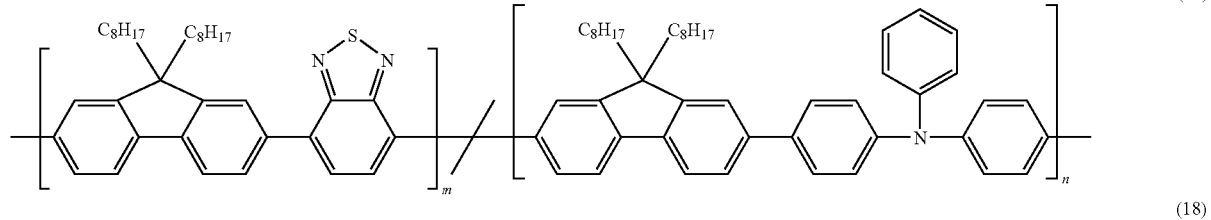
(18)
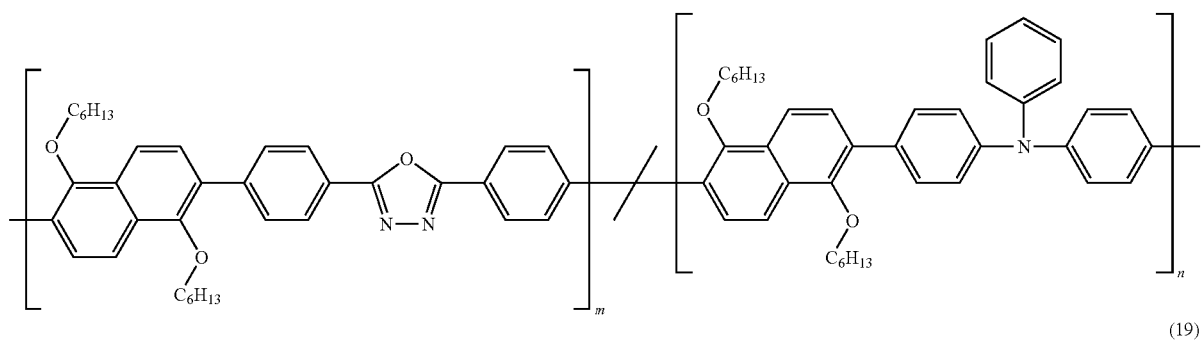
(19)
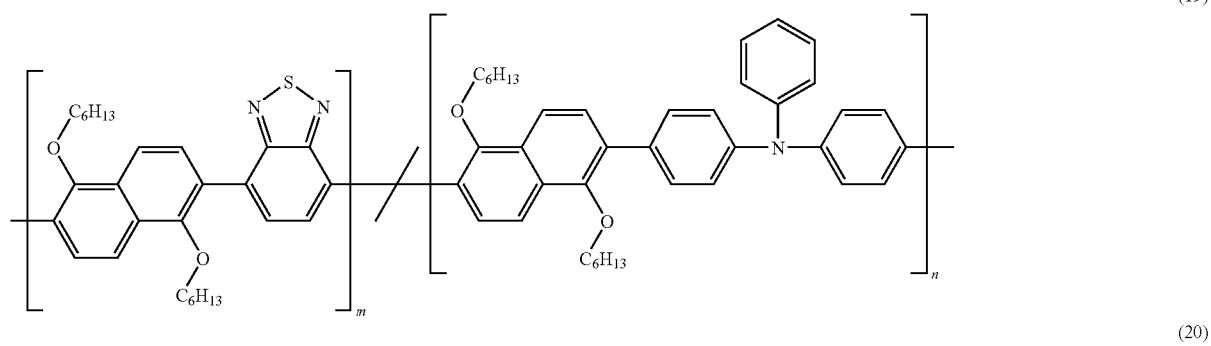
(20)
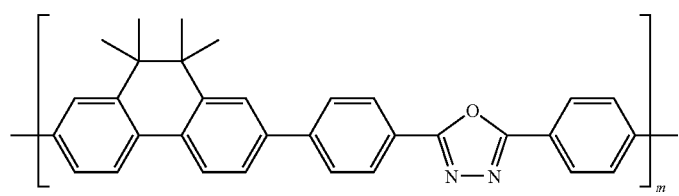
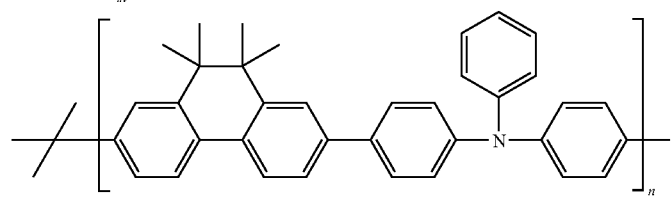

-continued
(21)
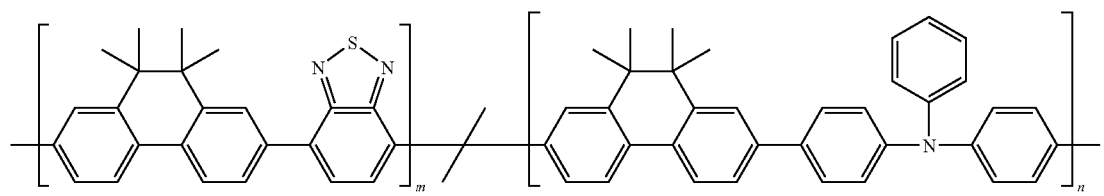
(22)
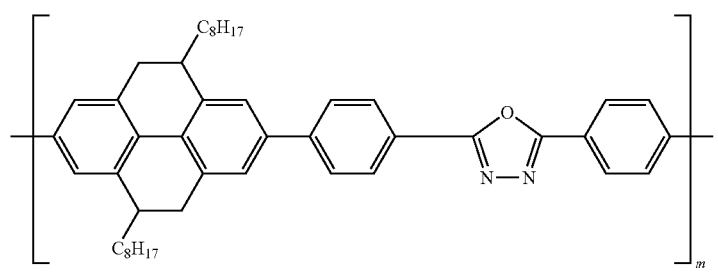
(23)
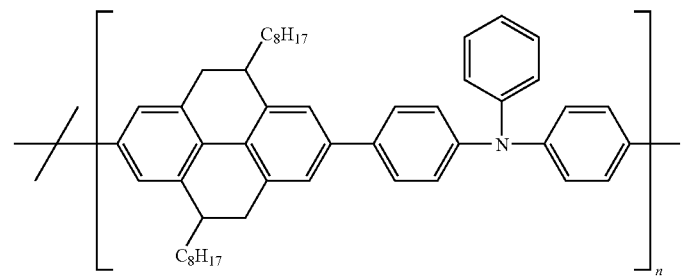
(24)
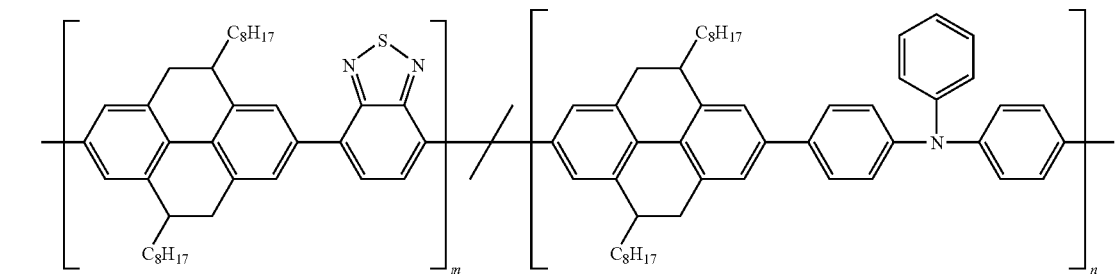
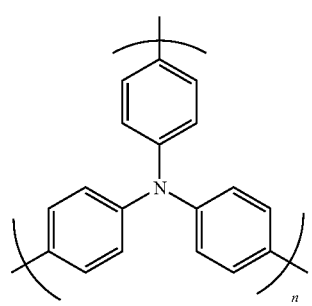

(25)
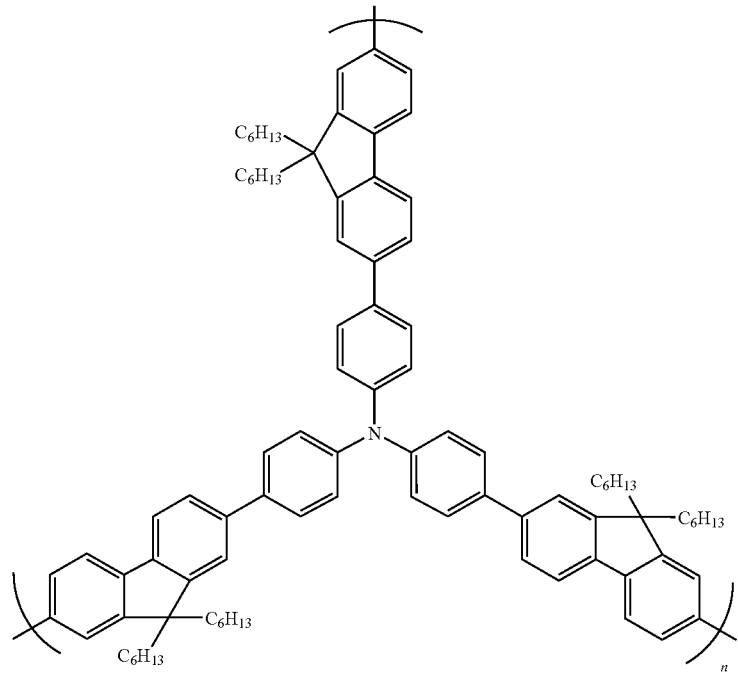
(26)
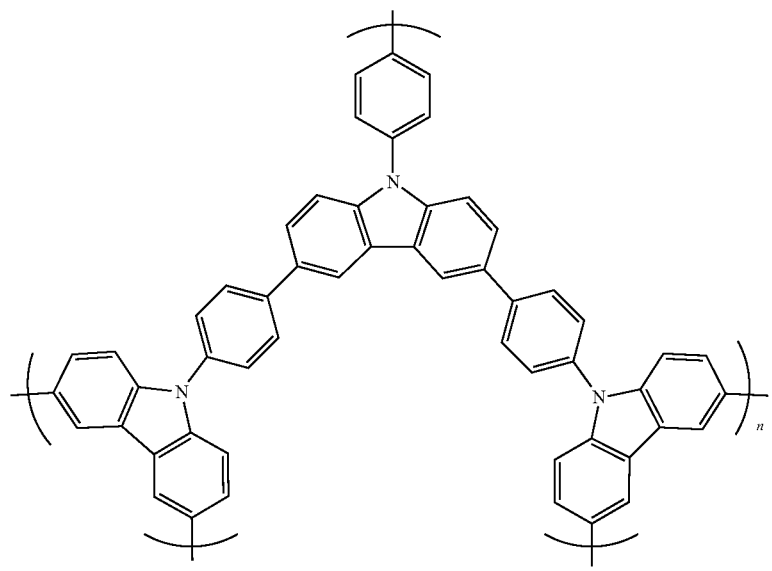

-continued
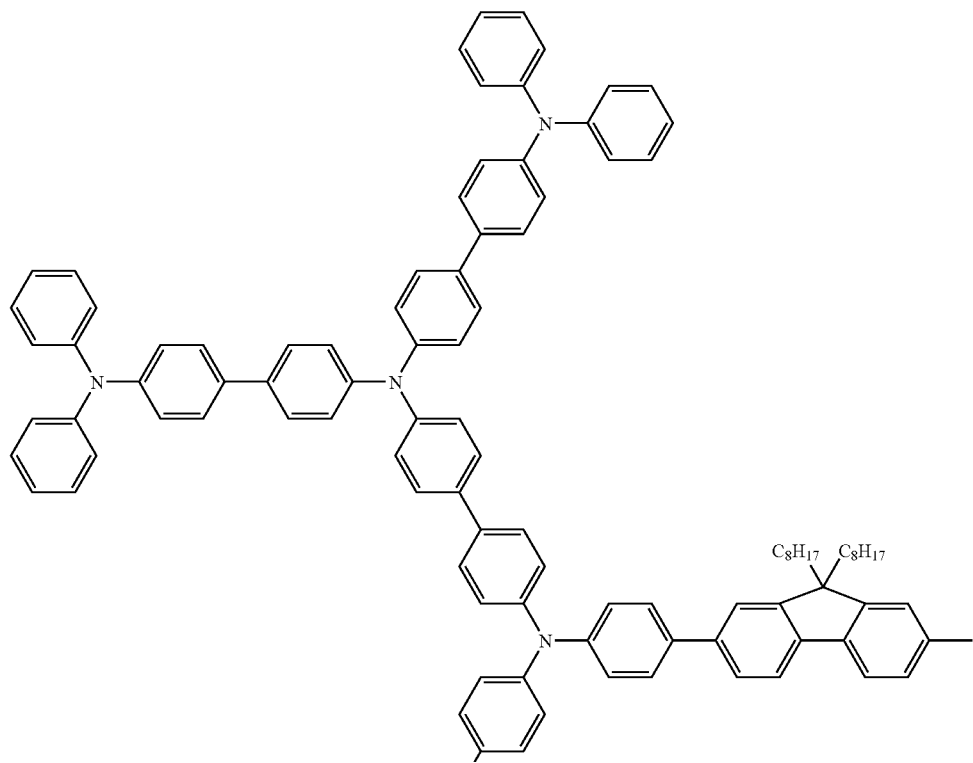
(27)
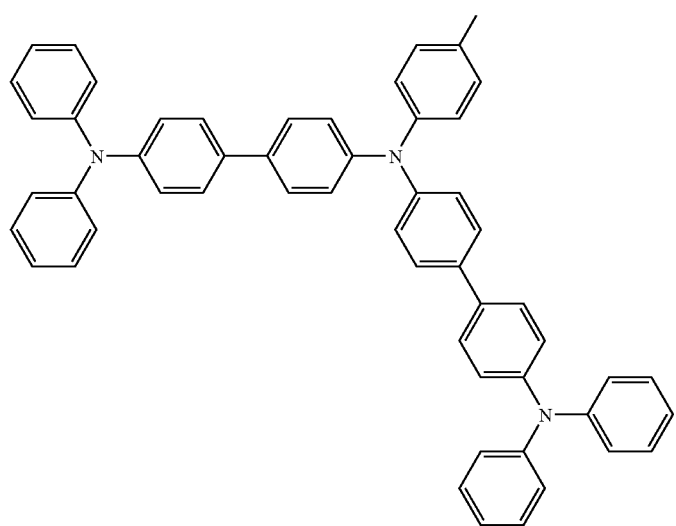

-continued
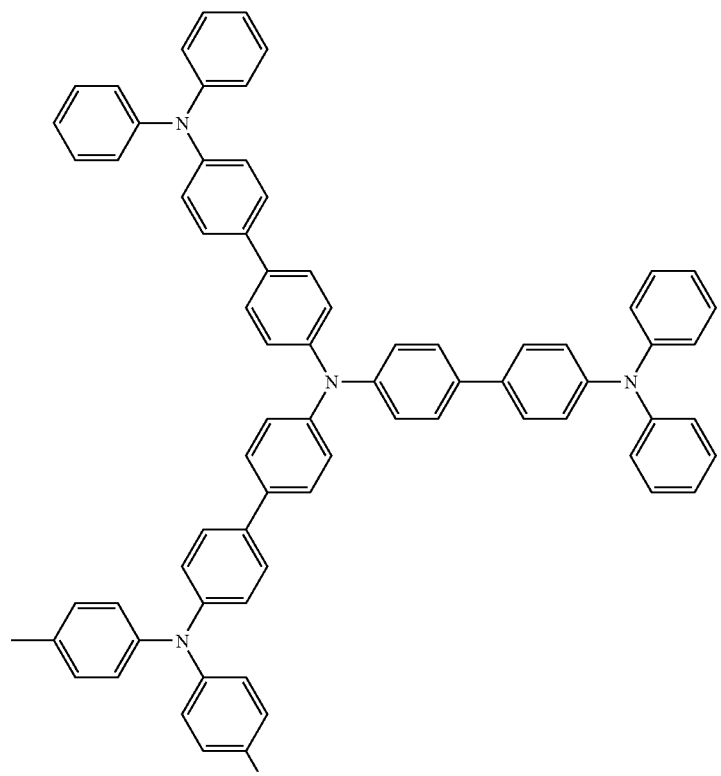
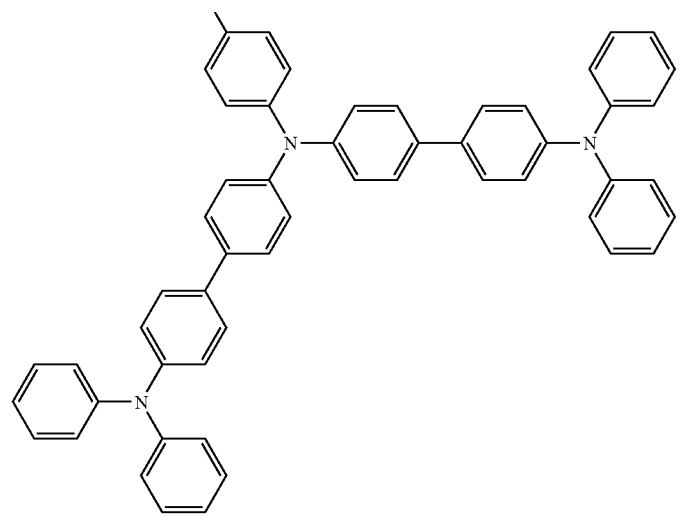
(28)
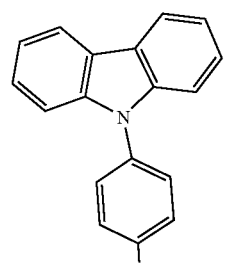

-continued
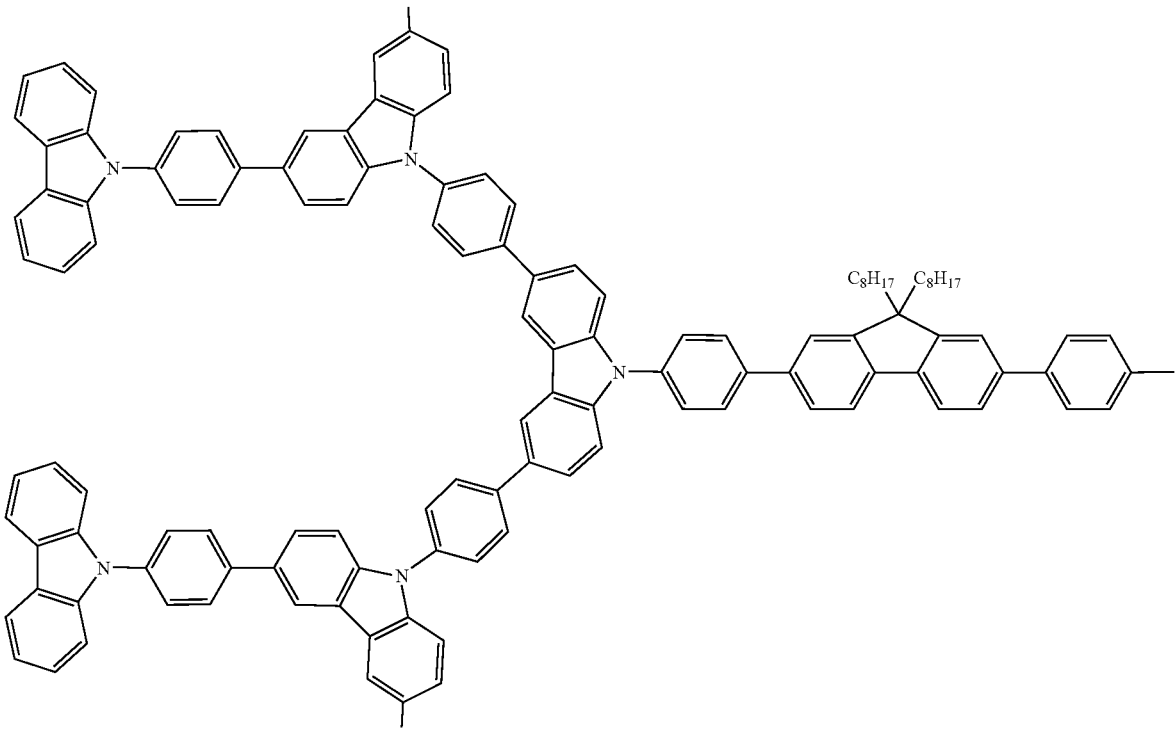
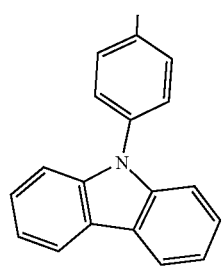
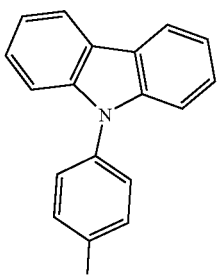

-continued

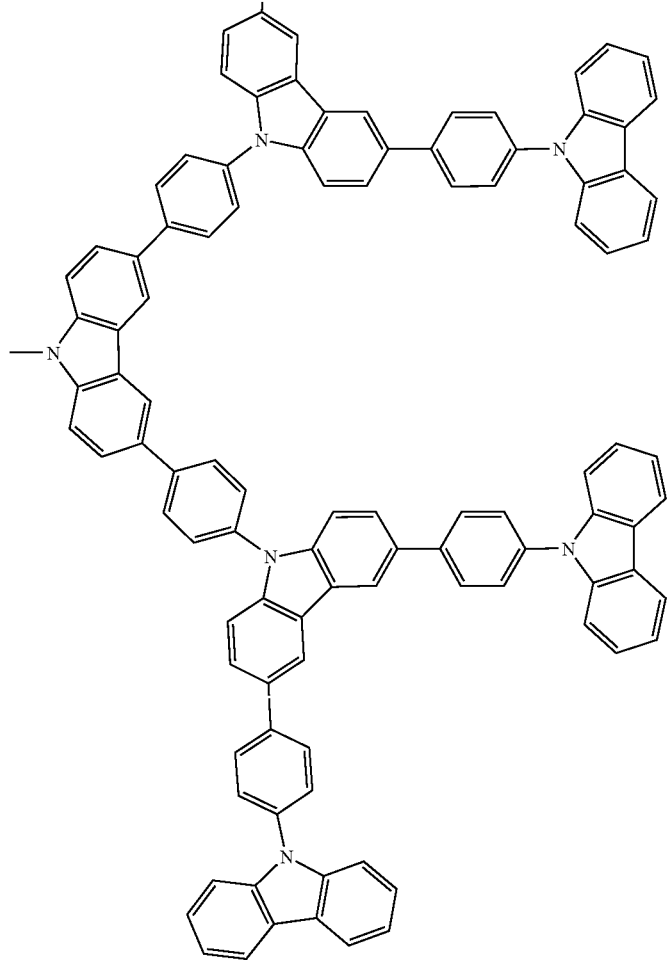

The invention claimed is:

1. A process for purifying an electroluminescent material, the process comprising treating, with a phosphorus-containing material, an electroluminescent material that contains Pd as an impurity so as to remove Pd.

2. The purification process for an electroluminescent material according to claim 1, wherein the electroluminescent material is synthesized using a Pd catalyst.

3. The purification process for an electroluminescent material according to claim 1, wherein the electroluminescent material is a polymer or an oligomer.

4. The purification process for an electroluminescent material according to claim 1, wherein the electroluminescent material is a conjugated polymer or oligomer.

5. An electroluminescent material purified by the purification process according to claim 1.

6. The electroluminescent material according to claim 5, wherein the Pd concentration is equal to or less than 100 ppm.

7. An electroluminescent device employing the electroluminescent material according to claim 5.

8. The purification process according to claim 3, wherein the electroluminescent material is the polymer.

9. The purification process according to claim 4, wherein the electroluminescent material is the conjugated polymer.

* * * * *